US005357254A

United States Patent [19]

Kah, Jr.

[11] Patent Number: 5,357,254

[45] Date of Patent: Oct. 18, 1994

[54] LOCATION MONITORING SYSTEM

[76] Inventor: Carl L. C. Kah, Jr., 778 Lakeside Dr., N. Palm Beach, Fla. 33408

[21] Appl. No.: 97,156

[22] Filed: Jul. 26, 1993

Related U.S. Application Data

[62] Division of Ser. No. 777,189, Sep. 18, 1985, Pat. No. 5,245,314.

[51] Int. Cl.[5] ........ G01S 13/74

[52] U.S. Cl. ........ 342/42; 340/539; 340/573

[58] Field of Search ........ 342/42, 385, 386; 340/539, 573

[56] References Cited

U.S. PATENT DOCUMENTS 4,023,138 5/1977 Ballin .

4,593,273 6/1986 Narcisse ........ 340/539

5,245,314 9/1993 Kah, Jr. ........ 340/539

*Primary Examiner*—Mark Hellner

*Attorney, Agent, or Firm*—Jack N. McCarthy

[57] ABSTRACT

A location monitoring system is provided having a radio frequency transmitter for a person or object and radio frequency receiver for someone to monitor movement of the person or object, the receiver sounding an alarm at a predetermined time after failure to receive a signal. The transmitter is made having an intermittent transmitted signal and the receiver is made having an off-timer to coordinate with the intermittent signal, the off times saving battery power. The radio frequency receiver has an electronic switching device controlled by the radio frequency transmitter for sounding an alarm. An antenna is located in part of the carrying strap of the transmitter. The radio frequency transmitter can have various devices for sounding the alarm.

9 Claims, 2 Drawing Sheets

Fig. 6
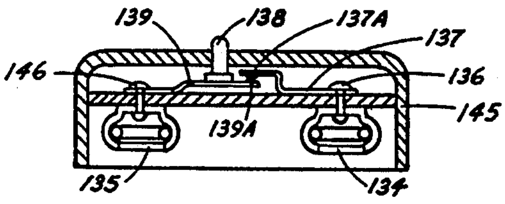
Fig. 7
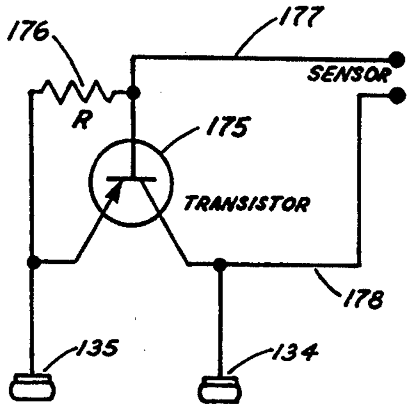
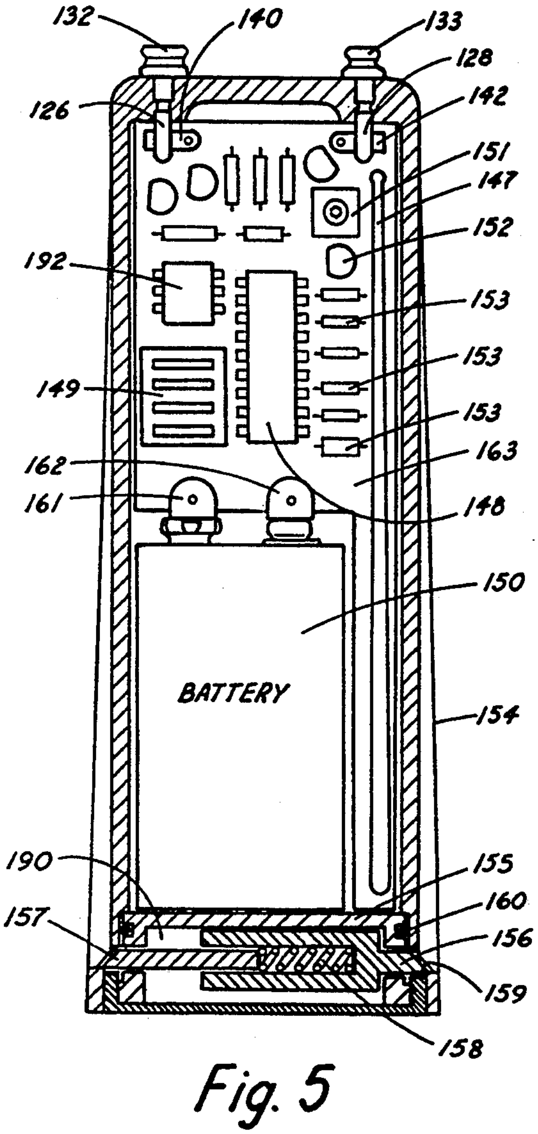
Fig. 5
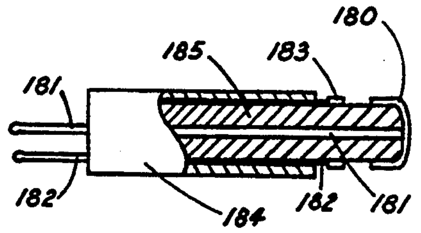
Fig. 8

LOCATION MONITORING SYSTEM

This application is a division of application Ser. No. 777,189, filed Sep. 18, 1985, of Carl L. C. Kah, Jr. for LOCATION MONITORING SYSTEM now U.S. Pat. No. 5,295,314.

TECHNICAL FIELD

This invention relates to a location monitoring device utilizing a radio transmitter (s) and a radio receiver (s); to determine range and direction between two or more relative moving objects, if a preset range is exceeded means are included to provide an alarm or action instruction signal.

BACKGROUND ART

While many types of radio signal transmitters and receivers have been used to signal the presence of a person or object, no patent appeared to set forth a system such as described herein. Patents uncovered which relate to the field are the following: U.S. Pat. Nos. 4,403,341; 4,430,757; 4,121,160; 3,163,856; 4,110,741; 4,359,723; 3,806,936; 3,336,530; and 3,243,812.

DISCLOSURE OF INVENTION

An object of the present invention is to provide a personal alarm system including transmitting and receiving devices for determining the range and direction between two or more relatively moving objects and while a person, or object, is in a desired range, an alarm or action signal in the receiving device is prevented from being activated, with alarm actuation occurring in the receiving device if that range is exceeded, at which time the direction to the transmitter can be determined. The signals can be continuous or periodic.

A further object of the invention is to provide a radio frequency transmitter which has a circuit which can be interrupted, such as by the removal of a plug from a jack or disconnecting a conducting snap strap.

Another object of the present invention is to provide a receiver device which prevents an alarm from being actuated until a cooperating transmitter device has exceeded a predetermined range, the range being changeable at the receiver device so that when a minimum range is exceeded, it can be easily changed to a greater range to identify how far away the transmitter device is. If the transmitter device falls into water, the transmitted signal would be canceled, regardless of the range.

A further object of the invention is to provide for both periodic transmitter and receiver operation—to reduce their power consumption, yet provide a prompt indication of loss of received or out-of-range signal from the transmitter.

Another object of the invention is to provide a receiver with a conducting base plate across one side of its carrying case which is connected to the receiver's circuit ground and a $\frac{1}{4}$ or $\frac{1}{2}$ wave length antenna which can be concealed in the receiver's carrying case shoulder strap.

A further object of the invention is to provide a sealed transmitter enclosure with external snap terminals to allow addition of special control features, such as a moisture sensor.

Another object of the invention is to provide a transmitter signal selectably coded by pulse modulating the carrier frequency. The receiver circuit has a decoding circuit whose pulse grouping must be matched by the transmitting signal or the alarm circuit is activated. This allows selected receiver-transmitter pairs to be matched for no interference when operating in the same area with other units or to have the receiver scan for several transmitter signals where one person can monitor the location of several children with one receiver.

BRIEF DESCRIPTION OF THE DRAWINGS

FIG. 5 is a sectional view of a sealed transmitting device with external power circuit snaps for control of the transmitter;

FIG. 6 is a sectional view of a special feature snap-on cap for the transmitter having an "On-Off" switch;

FIG. 7 is a moisture sensor circuit that could be enclosed in the special feature snap-on cap; and FIG. 8 is a simple moisture sensor configuration.

BEST MODE FOR CARRYING OUT THE INVENTION

Figure 1:
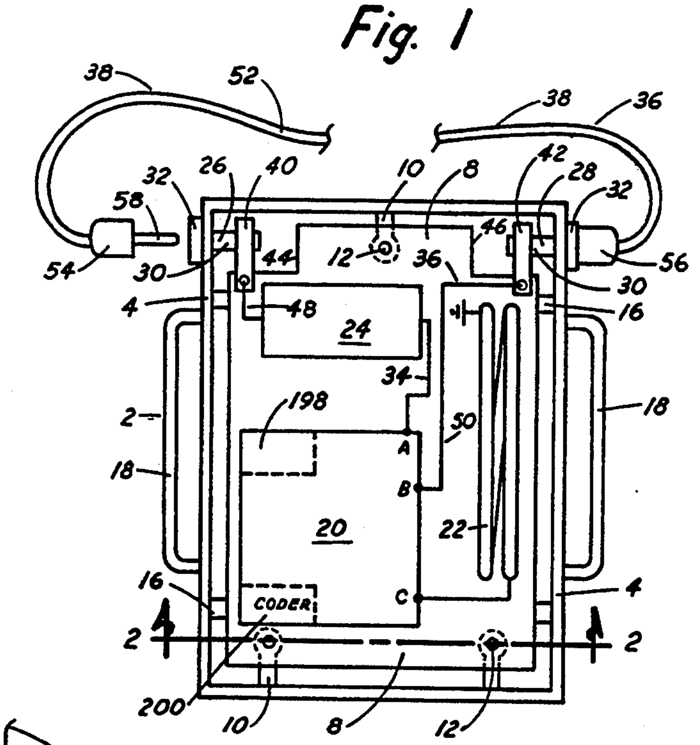
FIG. 1 is a view of a transmitting device with the cover off, showing a diagrammatic arrangement of the transmitting components.

FIG. 1 shows a transmitting device 2 having a plastic container 4 with its plastic top 6 (see FIG. 2) removed. A circuit board 8 is positioned in the container spaced from the bottom thereof on projections 10. Holes 12 in circuit board 8 are aligned, one each, with a hole 14 in each projection 10, for a purpose to be hereinafter described. Side projections 16 aid in aligning the circuit board 8 in container 4 when assembling the transmitting device 2.

Plastic container 4 has belt loop projections 18 on each side thereof to receive a belt for attaching the transmitting device 2 to a child. While belt loop projections 18 have been shown, other means for attaching the transmitting device 2 to a person, or object, can be used, such as clips.

A radio frequency transmitter 20 is positioned on circuit board 8, and can be one of many types of transmitters. A loop antenna 22 for the transmitter 20 is formed as a coil, with the coil being positioned on the circuit board 8 projecting upwardly so that a plane between the two legs of the loop in FIG. 1 will be perpendicular to the ground and to the body of the carrier when it is worn, for best radiation at minimum power. A power source, or battery, 24, is also located in the plastic container 4 connected to the circuit board 8.

A connector jack 26 is located on one side of the container 4 at one end and a second connector jack 28 is located on the other side of the container 4 at the same end. Each connector jack, 26 and 28, comprises a metallic cylindrical portion 30, extending through the side of the container 4 and projecting into its interior, for a purpose to be hereinafter disclosed. An outer metallic flange 32 abuts the container 4 and is fixed thereto, such as by cementing.

The power source, or battery, 24, for the radio frequency transmitter 20, is connected to one terminal A of transmitter 20 by a conductor 34, and to another terminal B of transmitter 20 through a circuit 36 having a removable section 38 located externally of the container 4.

Circuit 36 includes the two connector jacks 26 and 28, fixed to the container 4 and projecting into the container 4, and two metallic spring contacts 40 and 42 fixed to the circuit board 8 for contacting the connector jacks 26 and 28, respectively, when the circuit board 8 is fixed in place in container 4. Metallic spring contact 40 extends over corner cut-out portion 44 of circuit board 8 to contact the metallic cylindrical portion 30 of connector jack 26, and metallic spring contact 42 extends over corner cut-out portion 46 of circuit board 8 to contact the metallic cylindrical portion 30 of connector jack 28. Metallic spring contact 40 is connected to the battery 24 by a conductor 48. Metallic spring contact 42 is connected to terminal B of transmitter 20 by a conductor 50. Circuit 36 includes the conductors 48 and 50.

Removable section 38 of circuit 36 includes a conductor 52 having a connector plug 54 at one end and a connector plug 56 at the other end to complete circuit 36. Each plug 54 and 56 includes a metallic prong 58 connected to the conductor 52. Each metallic prong 58 is sized to fit into the metallic cylindrical portion 30 of its cooperating connector jack 26 and 28 to make contact and be frictionally held thereby. It can be seen that if either plug 54 or 56 is pulled so that prong 58 is removed from its cooperating jack, 26 or 28, so that there is no longer contact with metallic cylindrical portion 30, then the battery 24 is disconnected from the transmitter 20 and it ceases to transmit. While a removable section 38 has been shown with two plugs, 54 and 56, for contact with two connector jacks, 26 and 28, one end of removable section 38 can be fixed in place to maintain continuous contact, with only one plug and jack being used or snaps instead of plugs.

Figure 2:
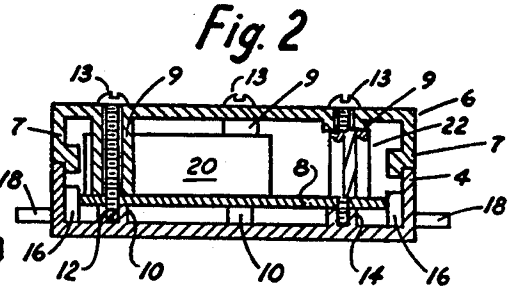
FIG. 2 is a sectional view taken on the line 2—2 of FIG. 1, showing the cover in place and an end view of the loop antenna.
Figure 3:
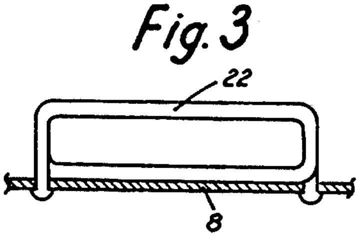
FIG. 3 is a side view of the loop antenna of FIG. 1.

Plastic top 6, shown in FIG. 2, has downwardly projecting mating sides for contacting the top of the sides of the plastic container 4. The top 6 also has a downwardly projecting cylindrical boss 9 having a hole 11 extending therethrough aligned with each hole 12 in circuit board 8 and cooperating hole 14 in each projection 10. The ends of the bosses 9 engage the top of the circuit board 8. A bolt 13 extends through each hole 11 and hole 12 and is threaded into hole 14; this fixes the circuit board 8 in place and holds the top 6 on.

Figure 4:
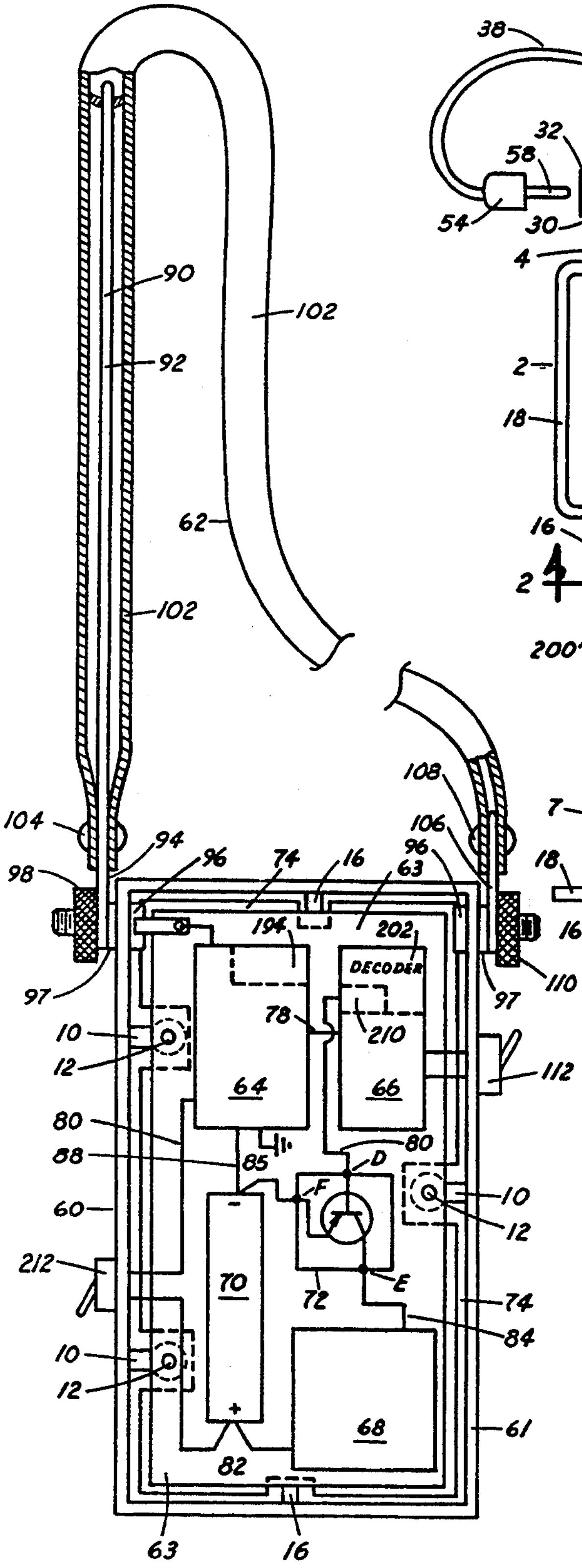
FIG. 4 is a view of a receiving device with the cover off, showing a diagrammatic arrangement of the components including an alarm.

FIG. 4 shows a receiving device 60 having a plastic container 61 with its top removed. Said top is similar to the top 6 shown in FIG. 2 for the plastic container 4 of transmitting device 2, said plastic container 61 having similar projections 10 and projections 16; said top fixing a circuit board 63 in place along with said projections 10 and projections 16. Plastic container 61 has a carrying strap means 62 for carrying the receiving device 60.

A radio frequency receiver circuit 64 is positioned on circuit board 63 and can be one of many types of receiver circuits. It is tuned to the frequency of the transmitting device 2. Also positioned on the circuit board 63 is an amplifier 66, an alarm 68, a battery 70, and a transistor 72. The container 61 also includes a conducting base plate 74 which is Fixed to the bottom of the container 61 and electrically connected to a circuit ground of the receiver 64. An external "ON"-"OFF" switch 212 is provided to turn the device "ON" or "OFF".

The radio frequency receiver circuit 64 is connected to the amplifier 66 by a conductor 78 and the output of the amplifier 66 is connected to terminal D of transistor 72 by a conductor 80. Terminal D is connected to the control base of the transistor. The transistor 72 can be of a type such as MP2N6427. The alarm 68, which can be a buzzer, a light, or any known device, is connected to one terminal of battery 70 by a conductor 82 and to the other terminal of battery 70 through transistor 72. Output terminal E of transistor 72 is connected to the alarm by conductor 84, and the other terminal of battery 70 is connected to terminal F of the transistor 72 by conductor 85. Terminals E and F are conductively connected to the control base for controlling Flow from the battery 70 to alarm 68. The battery 70 also has its two terminals connected to the radio frequency receiver circuit 64 by conductors 86 and 88 to provide power thereto. Switch 212 is placed in conductor 86.

A receiving antenna 90 is attached to the container 61 and forms part of the carrying strap means 62. The antenna 90 comprises a metal wire 92 having a flat end 94 with a hole therethrough. A threaded bolt 96, formed of a conductive metal, extends through a hole in the top of each side of the container 61 with the head inside the case. A metal nut 97 is threaded over the threaded portion of the bolt 96 and tightened against the container 61 to fix the bolt 96 in place, leaving a projecting threaded portion. The hole of the flat end 94 of the antenna 90 is placed over the projecting threaded portion of bolt 96 on one side of the case and a nut 98 having a knurled surface is used to hold the antenna 92 in place. The bolt 96 is connected by a spring clip 100 on circuit board 63 to the radio frequency receiver 64.

A carrying strap 102 comprising a length of tubular resilient plastic, leather, or other known strap material, has one end placed over the antenna 92 with the free end fixed to the flat end 94 of the antenna 92, such as by rivets 104. The other end of the strap 102 has a short flat member 106 fixed thereto by rivets 108. The flat member 106 has a hole therein to receive the other projecting threaded portion of bolt 96 on the other side of the case; a metal nut 97 is threaded over the threaded portion of bolt 96 and tightened against the container 61 to fix the bolt 96 in place, leaving a projecting threaded portion. A nut 110, having a knurled surface, is on that projecting portion and fixes that end of the carrying strap means 62 in place.

The output signal of the radio frequency transmitter 20 is selectively pulse coded by turning on and off a transistor in the transmitter's radio frequency circuit. A circuit 200, such as a National 8331 chip, is used to generate the selectable pulse code. The radio frequency receiver 60 has a matching decoding integrated circuit 202, such as National 8337, whose pulse grouping must match the transmitted signal pulse code or the integrated circuit's output activates transistor 72 and the alarm 68 will be activated. This allows selected receiver 60 and transmitter 20 pairs to be matched for no interference when operating in the same area.

Further, the receiver 60 can scan for several transmitter 20 signals so that one person with a receiver 60 can monitor the location of several children. This is done by a stepping integrated circuit, such as a Motorola 4022 chip which has eight output lines that are sequentially stepped from low to high as the integrated circuit's clocking input is cycled by a simple timing pulse from a timing circuit, such as a National 556 timing chip.

These outputs from the Motorola 4022 stepping chip can selectively be connected to the code selection inputs of the receiver's National 8337 decoder integrated circuit chip to sequentially selectively alter the acceptable received signal pulse code. If, at any time during a selected code period, a matching transmitted pulse code is not received from one of the several transmitters being monitored, then the receiver decoding integrated circuit 202, chip National 8337, gives a positive going output to terminal D through conductor 80 to turn on the transistor 72 and the alarm. The transistor's 72 output is also used to stop the clocking circuit which is stepping the 4022 code selection integrated circuit. LED indicators are provided on each of the 4022 chip's output line, to show which code output the scanning had stopped on and thus whose transmitter signal is missing.

The radio frequency receiver 64 converts the electromagnetic radiation received by its antenna 92 from the transmitting device 2 to an electrical signal which is amplified by amplifier 66. This signal is then sent to the decoding integrated circuit, such as the National 8337 chip. If the received signal level out of the amplifier is sufficient to satisfy the decoder circuit, i.e., 50% of the decoder circuit's supply voltage, and the pulse code matches the decoder chip selected pulse code, then there is a negative voltage at the decoder output which is transferred by conductor 80 to the control base of transistor 72, which prevents current flow therethrough. This action prevents the battery 70 from energizing the alarm. When the signal level from the transmitting device 2 falls below a predetermined value, the decoder integrated circuit's output goes positive, turning on the transistor 72, permitting the transistor to conduct, terminal F is connected to terminal E, thereby forming contact between conductor 85 and conductor 84, turning the alarm 68 on.

The range sensitivity of the receiver is controlled by controlling the gain of the operational amplifier 66 of the receiver, such as NEC C741C chip. The gain of the operational amplifier 66 is changed by a switch 112 that adds or subtracts resistance from the operational amplifier feedback network.

Switch 112 can have a low range setting; for example, 25 feet, and a high range setting; for example, 100 feet. With the switch 112 on its low range setting, a receiving device 60 operator, when the alarm 68 goes off, can immediately place the switch on the high range setting (higher receiver gain) to indicate if the child is within the longer range.

Although in the simplest configuration, the receiver's antenna is a simple ¼ or ½ wave length vertical aerial with a copper plate enhanced ground plane for maximum antenna gain and minimum directional characteristic, an alternate antenna loop may be provided that can be switched into the receiver's circuit, replacing the ¼ or ½ wave length di-pole configuration. This desirable 1 wave length wire loop is very directional and higher gain and when switched into the receiver's circuit, used to determine the direction of the transmitter from the receiver by rotating the loop until the signal disappears, setting off the alarm again or using the received signal level to modulate the frequency of the alarm sounder; i.e., the stronger the received signal, the higher pitched the alarm signal.

A standard voltage controlled oscillator, such as a National L N 566, may be used for this purpose. The received signal level voltage output from its operational amplifier, such as a National L M 358 N, is used as the frequency control input to the L N 566 voltage-controlled oscillator. The oscillator is then used to drive a piezoelectric alarm sounder with its pitch being proportional to the received signal level.

Transmitter and receiver power requirements can be greatly reduced by configuring them for intermittent operation.

The receiver circuitry can be provided with a charge retention circuit 210 having a capacitor and bleed resistor providing a time delay RC network that will keep the alarm shut off for a predetermined period so that the transmitted signal must be lost for a predetermined time, longer than two pulse repetitions of the transmitter, for example, before the alarm sounded. Each transmitted signal resets the time delay RC network through a diode so that the time the alarm is shut off extends from the last received signal. This will allow the transmitter to be operated intermittently to meet FCC requirements in certain frequency ranges and also significantly reduce the battery current drain for greatly increasing the transmitter's battery life.

To permit this intermittent, or periodic, operation, the transmitter has an on-off timing circuit 198 that automatically turns the transmitter on and off; for example, 0.1 second "ON" and 1 second "OFF". There are many circuit arrangements able to provide this repetitive cycling operation.

Since for long receiver battery life it is also desirable to have the receiver operate intermittently, a way must be provided to synchronize the transmitter and receiver operation so that the receiver does not have to remain on an excessive amount of time to be sure to be responsive to receiving the transmitted signals. This is accomplished in a uniquely effective manner. An off-cycle timer that periodically turns on the power to the receiver circuits is added. The timer is set up as a bi-stable flip-flop circuit 194, such as an LS 74 integrated circuit chip, controlling the power to the receiver circuits with an ON-OFF transistor, with only the OFF period being timed. The OFF timing is set up slightly less than the transmitter's OFF-timing period; for example, 0.9 seconds. Thus, if synchronization were achieved, the receiver would be turned on just prior to the transmitter being turned on, and turned off approximately together.

The synchronization can be easily achieved by having the receiver hi-stable timing, flip-flop circuit 194 remain "ON" until a transmitted signal is received. As mentioned above, a transmitter timing circuit 198 provides the intermittent operation of the transmitter. The received transmitted signal is then used to turn off the receiver and the off timer 194 is then again initiated. The receiver is turned "ON" again, just prior to the transmitter's "ON" timing period by the off timer 194. The transmitter need be on for only 0.1 second and can be off for 1 second and still have a very time-responsive alarm operation. If a transmitted signal is not received after two repetition periods as monitored by the charge retention circuit 210 in the receiver, the alarm circuit is allowed to be turned on in the manner previously described.

The electrical circuits, to accomplish the above functions, are not described in detail as there are a number of standard circuit components and arrangements to easily provide these functions as known by those having ordinary skill in the art. It is the timing sequence and concept that the receiver remain on until a transmitted signal is received that is unique to having lower power consumption receiver/transmitter circuits and still have good response. At a frequency of 49 MHz, the transmitter could be on for 0.1 seconds and off for a second and thus even with the wait period, never be more than approximately 2 seconds from an alarm response for loss of signal.

This system can be applied to a device for yachtsmen. Often only one person is on deck (watch) at a time in small crews. The previously described transmitter may be attached to the clothing of the crew member on deck or his life preserver. The receiver may be in the boat's cabin. Should the crew member on deck fall over, or children playing on deck Fall over, the transmitters would become submerged and ground out the transmitted RF signal, setting off the alarm in the receiver. This would alert the crew that someone was overboard.

A sealed transmitter housing 154 is shown in FIG. 5. The interior of housing 154 has a printed circuit board 163 having transmitter circuits and mounted components, and a battery 150. The printed circuit board 163 also has spring clips 140 and 142 to contact the internal projecting portions of terminals 126 and 128, respectively, which are part of the transmitter's electrical circuit. Terminals 126 and 128 are pressed or molded into the housing and have external snap contacts 132 and 133. The open bottom has a bottom cover 155 sealed with an "O" ring 160 and is held in place by a spring-loaded snap rod 158 mounted in a recess 190 in the bottom cover 155. The ends 156 and 157 of the snap rod 158 protrude from the periphery of the bottom cover 155 and when the bottom cover 155 is in place, the free ends of the ends 156 and 157 extend into opening means 159 around the inner periphery of the housing. The closure means is made to be hard to unsnap to prevent young children from removing the bottom cover 155.

The printed circuit board 163 is shown having a tunable capacitor 151; a transistor 152 for modulating ON/OFF pulsing of the transmitter RF circuit as controlled by a coding integrated circuit 148, such as a National 8331 chip; typical circuit resistors 153; dip rocker switches 149 for setting code's pulse code; loop antenna 147; and ON-OFF cycle timer 192. The printed circuit board 163 also has two battery snap receivers 161 and 162 to receive the two cooperating battery terminal snaps.

The external snap contacts 132 and 133 of the transmitter housing 154 can accommodate a separate fixture housing 145 with cooperating snap contacts 135 and 134 which snap on to contacts 132 and 133, respectively, to provide both the electrical and mechanical connection. The fixture housing 145 includes an upper compartment for housing a circuit which would provide for control of the transmitter, as shown in FIG. 6. One snap contact 135 is fixed to a partition in the housing 145, forming the upper compartment, by a retaining rivet 146, and the other snap contact 134 is fixed thereto by a retaining rivet 136. A fixed contact button 137A is placed on the top of the upper compartment with an electrical connection 137 to rivet 136, and a movable contact button 139A is biased against contact button 137A by a spring switch electrical connection 139 to rivet 146. The spring switch connection 139 also biases a push button 138 through an opening in the top of the fixture housing 145. It can be seen that when one pushes the button 138, contact button 139A will be separated from fixed contact button 137A, thereby opening the circuit and removing power to the transmitter, causing transmitter output to cease, thus activating the alarm in the receiver, as previously described for the operation for FIGS. 1 and 4.

Another circuit which could be placed in the compartment of a fixture housing 145 could be a moisture sensor circuit (see FIG. 7). The moisture sensor circuit consists of simply a transistor 175 whose base is bias high with a small high resistance resistor 176 from the most positive of the transmitter's snap contacts 134 and 135, and its emitter is also connected to that contact. Its collector is connected to the other most negative snap contact. Wires from the most negative contact and the transistor's control base are connected to a simple moisture sensor (FIG. 8).

If moisture completes the circuit between the sensor wires 177 and 178 from the transistor 175 pulling the transistor's control base down to ground level, the transistor 175 is shut off, turning off the transmitter and setting off the alarm. Moisture across the spacing of two small contacts or wire ends would typically give a 30K ohm resistance compared to the 1 Mg pull up resistor 176 bias on the transistor's control base.

A simple moisture sensor probe configuration (FIG. 8) would be to use coaxial wire which has a center conductor 181 and an outer sheath conductor 182. This wire has an outer insulation 184 and an inner insulation 185. The outer insulation is stripped back a short distance and a small ring 183 is swaged around the inner insulation 185 over the outer conduction sheath 182, making contact with it. A small cap 180 is put over the end, making contact with the center conductor 181. Moisture, when present, completes the circuit between contacts 180 and 183, and when they are connected to sensor wires 177 and 178, this shuts off the transistor 175 which opens the connection between snap contacts 135 and 134 and ceases transmitter output.

I claim:

1. A microwave receiving device for receiving a signal from a microwave transmitting device, said receiving device and transmitting device being mounted on relatively movable objects, the microwave receiving device having a microwave receiving circuit means, said receiver circuit means having range determination means for determining the range to the transmitter in order to discriminate between at least two ranges, said two ranges being a short range and a longer range, said last named means including a variable position switch, said variable position switch having a short range setting and a longer range setting, an alarm means, an electronic switching means positioned between said alarm means and said range determination means, said range determination means sending an output signal to said electronic switching means to control it, said electronic switching means will not permit said alarm means to be actuated when the range is determined to be less than said set range, said electronic switching means will permit said alarm means to be actuated when the separation range between transmitter and receiver exceeds said set range.

2. A radio frequency receiving device for receiving a signal from a radio frequency transmitting device, said receiving device and transmitting device being mounted on relatively movable objects, the radio frequency receiving device having a radio frequency receiving circuit means, said receiving circuit means having range determination means for determining the range to the transmitter, said last named means including a selectable variable position means for setting one of a plurality of ranges, an action instruction means connected to said range determination means through an electronic switching means positioned between said action instruction means and said range determination means, said range determination means sending an output signal to said electronic switching means to control it, said electronic switching means will not permit said action instruction means to be actuated when the range is determined to be less than said set range, said electronic switching means will permit said action instruction means to be actuated when the separation range between said transmitter and said receiver exceeds said set range.

3. A radio frequency receiving device having antenna means for receiving a signal from a radio frequency transmitting device, said antenna means having good directional sensitivity to locate the direction of the transmitting device from the receiving device, said receiving device also having range means for determining the range to the transmitting device, the range means also including means for selecting one of a plurality of action ranges for the receiver circuit to control an electronic switching means, the transmitter and receiver being mounted on relatively movable objects, such that when the preselected range is exceeded the electronic switching means is turned "ON" and the direction to the object may be determined.

4. A radio frequency receiving device having an antenna for receiving a signal from a radio frequency transmitting device, said receiving device and transmitting device being mounted on relatively movable objects, the radio frequency receiving device having a radio frequency receiving circuit means and an amplifier for amplifying the signal received from the antenna, said amplifier having means for changing its gain for providing different sensitivity levels in order to discriminate between at least two ranges of transmitting device location relative to said receiving device, said last named means including a variable position switch for setting one of a plurality of ranges, an alarm means, an electronic switching means positioned between said amplifier and said alarm means, said amplifier sending its output signals to said electronic switching means to control it, said electronic switching means will not permit said alarm means to be actuated when the received output signal is at or above a predetermined strength, said electronic switching means will permit said alarm means to be actuated when the received output signal is below a predetermined strength.

5. A radio frequency receiving device having two antenna means for receiving a signal from a radio frequency transmitting device, a first antenna means having a minimum directional sensitivity for general monitoring, a second antenna means having good directional sensitivity for directional monitoring, switching means for selecting between said first and second antenna, said second antenna being used to locate the direction of the transmitting device from the receiving device, said receiving device and transmitting device being mounted on relatively movable objects, the radio frequency receiving device having a radio frequency receiving circuit means and an amplifier for amplifying the signal received from the antenna, said amplifier having means for changing its gain for providing different sensitivity levels in order to discriminate between at least two ranges of transmitting device location relative to said receiving device, said last named means including a variable position switch, an alarm means, an electronic switching means positioned between said amplifier and said alarm means, said amplifier sending its output signals to said electronic switching means to control it, said electronic switching means will not permit said alarm means to be actuated when the received output signal is at or above a predetermined strength, said electronic switching means will permit said alarm means to be actuated when the received output signal is below a predetermined strength.

6. A microwave receiving device as set forth in claim 1 wherein said short range is 25 feet and said longer range is 100 feet.

7. A radio frequency receiving device as set forth in claim 4 wherein said two ranges are 25 feet and 100 feet.

8. A radio frequency receiving device as set forth in claim 2 wherein said plurality of ranges has a short range and a long range.

9. A radio frequency receiving device as set forth in claim 8 wherein said short range is 25 feet and said long range is 100 feet.

* * * * *